(12) United States Patent
Tai (10) Patent No.: US 6,392,146 B1
(45) Date of Patent: *May 21, 2002

(54) ELECTRICAL FIXTURE AND METHOD OF INSTALLING AN ELECTRICAL FIXTURE

(75) Inventor: Jen-Lung David Tai, Glendale, AZ (US)

(73) Assignee: Air Cool Industrial Co. Ltd., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/798,145

(22) Filed: Mar. 2, 2001

Related U.S. Application Data (63) Continuation of application No. 09/357,496, filed on Jul. 20, 1999, and a continuation-in-part of application No. 09/193,930, filed on Nov. 17, 1998, now Pat. No. 6,135,618.

(51) Int. Cl.[7] .................................................. H02G 3/14
(52) U.S. Cl. ............................ 174/66; 174/67; 174/48; 174/49; 362/250
(58) Field of Search ............................... 174/66, 67, 48, 174/49, 50, 54; 220/3.8, 241, 242; 248/74.3; 362/374, 375, 250

(56) References Cited

U.S. PATENT DOCUMENTS

| | | | | | |
|---|---|---|---|---|---|
| 3,018,363 | A | * | 1/1962 | Gibson et al. | 362/220 |
| 3,471,109 | A | * | 10/1969 | Meyer | 220/3.8 |
| 3,987,928 | A | * | 10/1976 | Mori | 220/241 |
| 4,415,957 | A | * | 11/1983 | Schwartz | 362/297 |
| 5,189,259 | A | * | 2/1993 | Carson et al. | 174/66 |
| 5,816,687 | A | * | 10/1998 | Tapp | 362/250 |
| 6,060,660 | A | * | 5/2000 | Bauer | 174/52.1 |
| 6,087,593 | A | * | 6/2000 | Skipworth et al. | 174/135 |
| 6,135,618 | A | * | 12/2000 | Tai | 362/250 |
| 6,259,025 | B1 | * | 6/2001 | Tai | 174/66 |

* cited by examiner

Primary Examiner—Dean A. Reichard
Assistant Examiner—Angel R. Estrada
(74) Attorney, Agent, or Firm—Parsons & Goltry; Michael W. Goltry; Robert A. Parsons (57) ABSTRACT

A housing including a base, a cover engagable to the base in a first position, a receptacle carried by the base for receiving and supporting the cover away from the base in a second position, and apparatus for engaging the cover to the base in the first position comprising at least one pin carried by the base and a keyway carried by the cover, the pin having a neck leading to an enlarged head and the keyway including an enlarged portion for receiving the enlarged head and a narrowed portion for accommodating only the neck.

15 Claims, 7 Drawing Sheets

FIG. 14

ELECTRICAL FIXTURE AND METHOD OF INSTALLING AN ELECTRICAL FIXTURE

The present application is a continuation of Ser. No. 09/357,496 filed Jul. 20, 1999 and a continuation-in-part of U.S. patent application of the same title, bearing Ser. No. 09/193,930, filed Nov. 17, 1998 now U.S. Pat. No. 6,135, 618.

FIELD OF THE INVENTION

This invention relates generally to electrical fixtures and, more particularly, to an improved electrical fixture housing and method of installing an electrical fixture.

BACKGROUND OF THE INVENTION

A typical electrical fixture, such as an electrical light fixture, normally includes a plate and a removable cover. The plate is normally fastened to a wall at an outlet box having hot and neutral leads. After the plate is fastened, typical installation normally includes coupling hot and neutral connector leads carried by the cover with the hot and neutral leads of the outlet box for facilitating the transfer of electrical power to, for instance, light bulbs carried by the cover. During this operation, a user must support the cover with one hand and struggle with the other hand to couple the hot and neutral leads from the outlet box with the hot and neutral connector leads of the cover. For large electrical fixtures, it is often necessary for one person to hold the cover while another electrically connects the cover with the outlet box.

Accordingly, it would be highly desirable to provide a new and improved electrical fixture, electrical housing and method of installing an electrical fixture.

It is a purpose of the present invention to provide a new and improved electrical fixture that is easy to construct.

It is another purpose of the present invention to provide a new and improved electrical fixture that is inexpensive.

It is still another purpose of the present invention to provide a new and improved electrical fixture that is easy to install with only one user.

It is a further purpose of the present invention to provide a new and improved method of installing an electrical fixture that is easy and convenient.

It is still a further purpose of the present invention to provide a new and improved method of installing an electrical fixture that may be carried out with only one user.

SUMMARY OF THE INVENTION

The above problems and others are at least partially solved and the above purposes and others are realized in an electrical fixture generally of a type for mounting against a wall and for supporting one or more conventional light bulbs such that when energized with electrical energy will illuminate a desired space. In a specific embodiment, the electrical fixture of the present invention is comprised of a housing including a base, a cover carried by the base in a normal first position and engagable in electrical communication with an electrical power source, a receptacle carried by the base for receiving and supporting the cover away from the base in a second position, and engagement apparatus for detachably engaging the cover with the base in the normal first position of the cover. The receptacle comprises one of a slot and a plurality of slots.

Engagement apparatus comprises an engagement assembly carried by one of the base and the cover, and a detachably engagable complemental engagement assembly carried by the other one of the base and the cover. The engagement assembly comprises a plurality of pins mounted in spaced relation and for movement in reciprocal directions between first and normal second positions. The complemental engagement assembly comprises a plurality of apertures each for detachably receiving one of the plurality of pins in one of the first and normal second positions.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

DETAILED DESCRIPTION OF A PREFERRED EMBODIMENT

The present invention provides, among other things, a new and improved fixture housing and method of installing an electrical fixture. Ensuing embodiments of the invention are easy to construct, easy to implement with existing electrical fixture apparatus and greatly increase the ease and efficiency of installing electrical fixtures.

Figure 1:
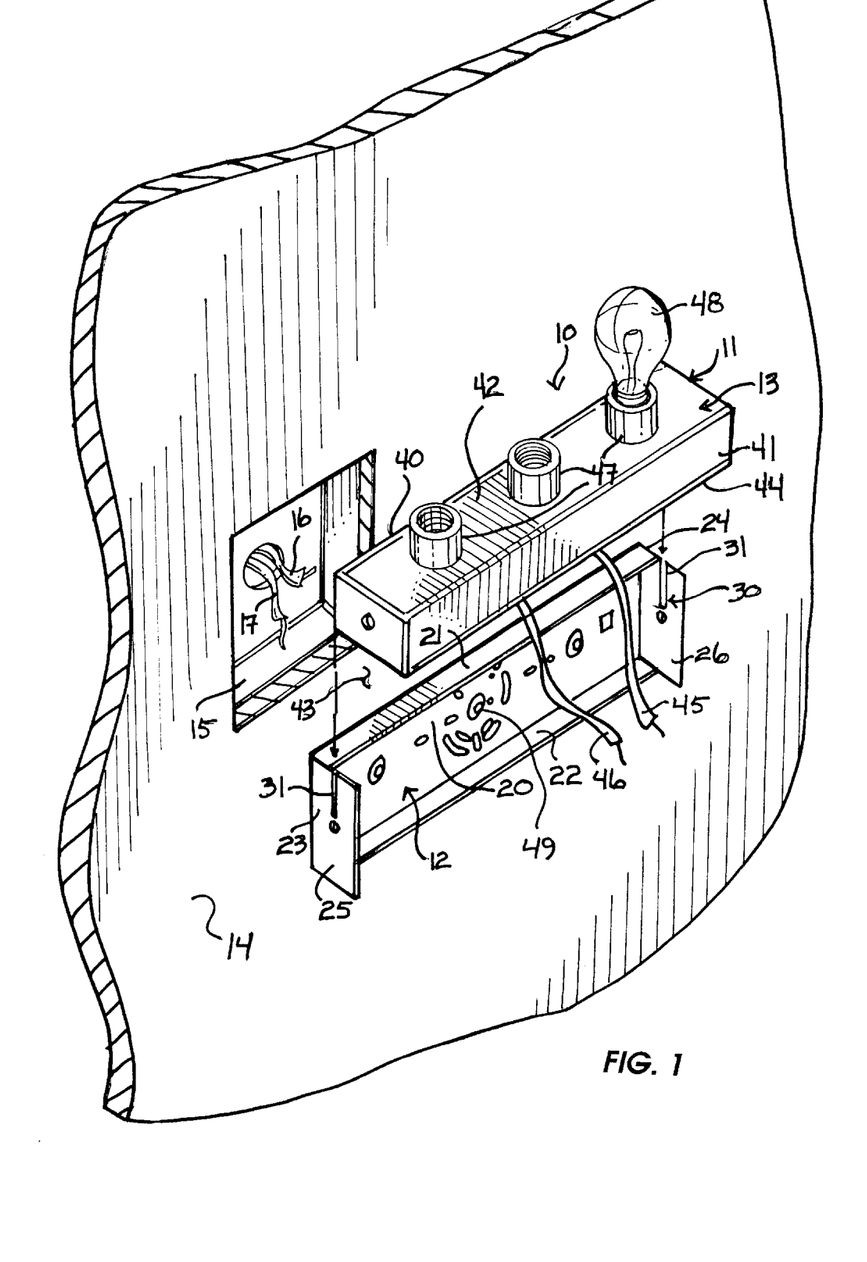
FIG. 1 is an exploded isometric view of an electrical fixture including a housing comprising a base and a cover, the electrical fixture shown as it would appear spaced from a wall having an outlet box including hot and neutral leads.

Turning now to the drawings, in which like reference characters indicate corresponding elements throughout the several views, attention is first directed to FIG. 1 illustrating an exploded isometric view of an electrical fixture 10. Electrical fixture 10 is generally of a type for mounting against a wall and for supporting one or more conventional light bulbs such that when energized with electrical energy will illuminate a desired space.

Electrical fixture comprises a housing 11 including a base 12 and a cover 13, electrical fixture 10 shown as it would appear spaced from a wall 14 having an outlet box 15 including hot and neutral leads, 16 and 17, each of which are generally intended to collectively define an electrical power source. Base 12 comprises a plate 20 having an upper edge 21, a lower edge 22, a first end 23 and a second end 24. A first extension 25 extends outwardly from plate 20 adjacent first end 23 and a second extension 26 extends outwardly from plate 20 adjacent second end 24. First and second extensions 25 and 26 are carried by plate 20 in spaced-apart and substantially opposing relation defining substantially parallel planes.

Plate 20 also carries a receptacle 30. In this specific embodiment, receptacle 30 comprises one or more of plurality of slots each being designated by the reference character 31. Each one of the plurality of slots 31 is shown carried by one of first and second extensions 25 and 26, although each one of slots 31 may be carried by plate 20 at other locations. In this specific example, each slot 31 extends inwardly into one of first and second extensions 25 and 26 in a direction generally from upper edge 21.

Cover 13 comprises a body 40 including a continuous sidewall 41 having a closed end 42 and an open end 43 defined generally by a substantially continuous free edge 44 of body 40 opposite closed end 42. Cover 13 further includes hot and neutral connector leads 45 and 46. In this specific embodiment, hot and neutral connector leads 45 are coupled to sockets 47 carried by closed end 42 of body 40 in series, one of the sockets 47 shown as it would appear carrying or otherwise accommodating, such as by threaded engagement, a light bulb 48 in accordance with conventional light fixtures.

Electrical fixture 10 may be mounted in electrical communication with a conventional outlet box for providing illumination to a desired space. To install electrical fixture 10 in electrical communication with outlet box 15, it is important to mount base 12 to wall 14 adjacent outlet box 15 as shown substantially in FIG. 2 with screws, nails, a selected adhesive or other desired fastening mechanism. Base 12 serves as the underlying support for electrical fixture 10 and must, therefore, be installed apart from cover 13, after which cover 13 may be coupled in electrical communication with outlet box 15 and subsequently mounted to base 12. With base 12 so installed, hot and neutral leads 16 and 17 may be passed through base 12, such as through opening 49 (shown in FIGS. 1 and 2), to be made available for electrical interconnection with cover 13 as clearly shown in FIG. 2.

Figure 2:
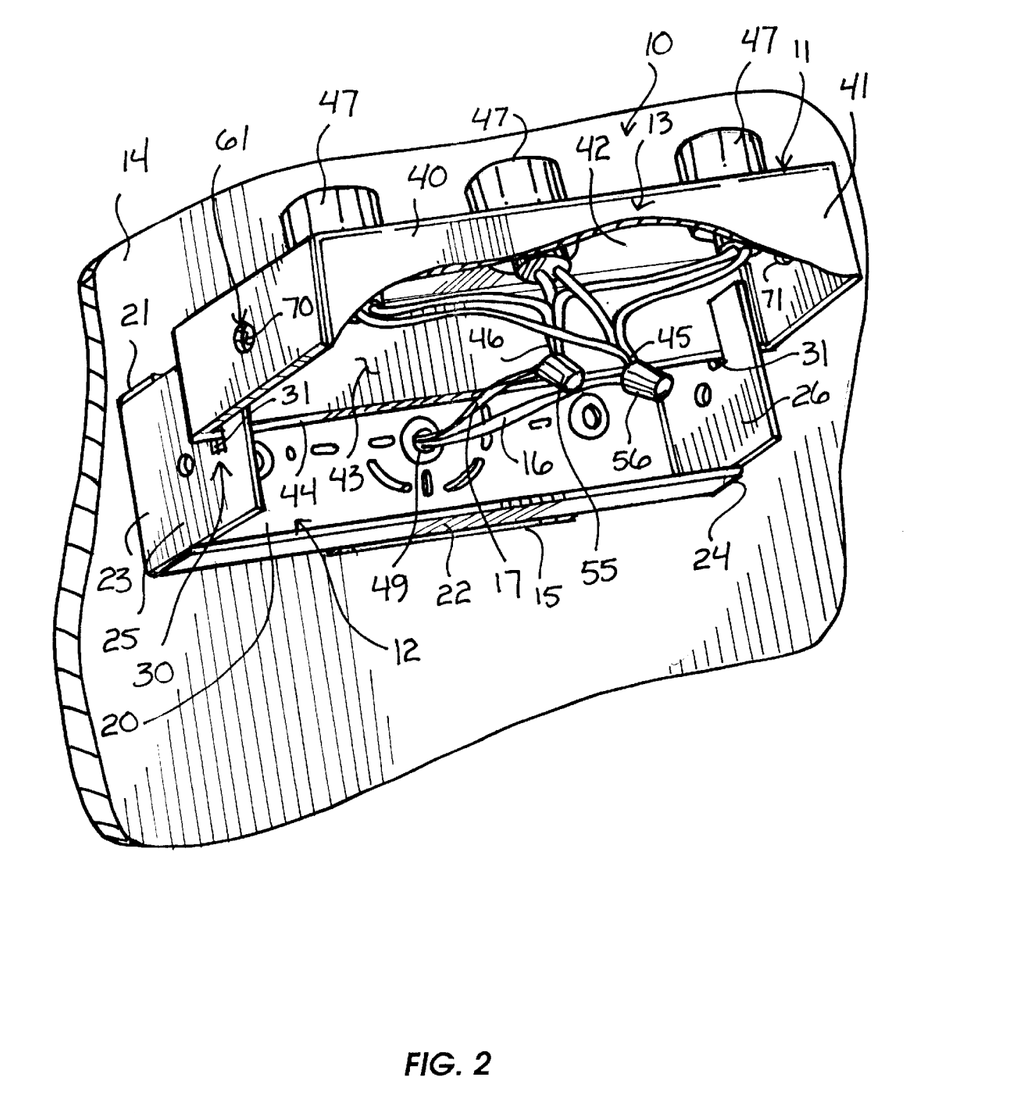
FIG. 2 is an isometric view of the base shown as it would appear mounted with the wall with the cover shown carried by, and supported away from, the base.
Figure 3:
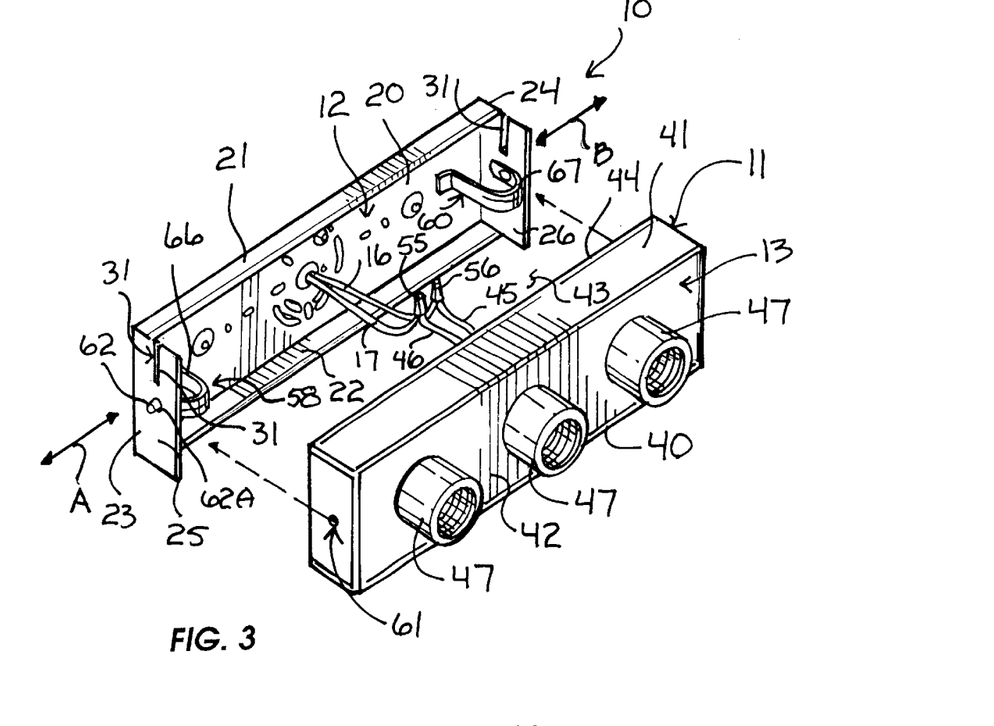
FIG. 3 is an isometric view of the cover spaced from the base with the hot and neutral leads from the outlet box shown coupled in electrical communication with hot and neutral connector leads of the cover.

To install cover 13 with base 12 and in electrical communication with hot and neutral leads 16 and 17, cover may be grasped and, with free edge 44 facing receptacle 30, portions of continuous sidewall 41 inserted into receptacle 30 and, more particularly, into one of slots 31 or both of slots 31 as substantially shown in FIG. 2. So inserted into receptacle 30 defining a second position of cover 13, cover 13 is supported or held outwardly or otherwise away from base 12 leaving base 12 largely exposed, With cover 13 so supported by receptacle 30, a user may couple hot and neutral leads 16 and 17 in electrical communication with hot and neutral connector leads 45 and 46, respectively, via wire nuts 55 and 56 as shown or other suitable mechanical wire connector without having to attend to cover 13. With cover 13 coupled in electrical communication with outlet box 15, cover 13 may be grasped and removed from receptacle 30 as shown in FIG. 3 and then secured to substantially enclose base 12 as shown in FIG. 4 in a normal first position of cover 13.

Figure 5:
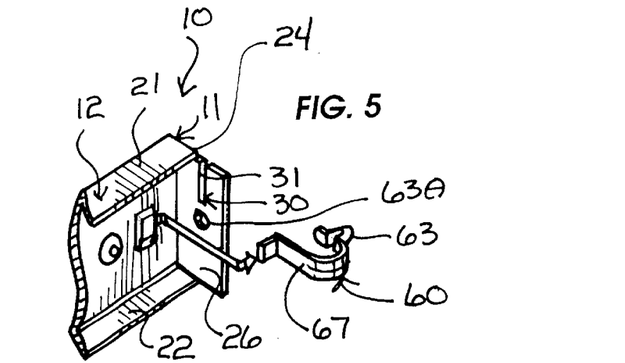
FIG. 5 is a fragmented perspective view of the base of FIG. 1 and an engagement element for detachably securing the cover with the base, the engagement element shown spaced from the base.
Figure 6:
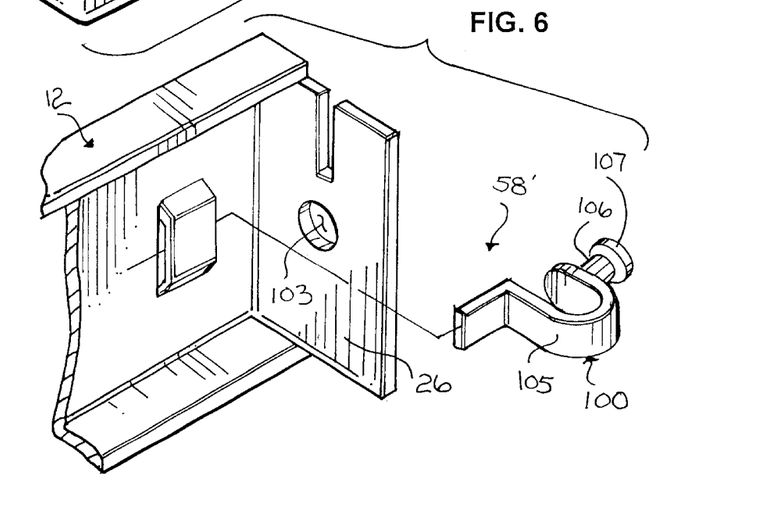
FIG. 6 is a fragmented perspective view of the base of FIG. 1 and an alternate embodiment of an engagement element for detachably securing the cover with base, the engagement element shown spaced from the base.

To secure cover 13 with base 12 in the normal first position, the present invention further includes engagement apparatus 58. Engagement apparatus 58 may be located at any convenient location along the full extent of base 12 and cover 13. In a specific embodiment, engagement apparatus 58 comprises an engagement assembly 60 carried by base 12 and a detachably engagable complemental engagement assembly 61 carried by cover 13. In the specific embodiment shown in FIG. 3, engagement assembly 60 comprise a first pin 62 mounted adjacent first extension 25 for movement in reciprocal directions through an opening 62A carried by first extension 25 as generally indicated by the double arrowed line A between first inward and normal second outward positions, and a second pin 63 (FIG. 5) mounted adjacent second extension 26 for movement in reciprocal directions through an opening 63A (shown only in FIG. 5) carried by second extension 26 as generally indicated by the double arrowed line B between first inward and second outward positions. Springs, 66 and 67, carried by base 12 support first and second pins 62 and 63, respectively, and normally bias first and second pins 62 and 63 in the second outward positions, respectively. Springs 66 and 67 may each be constructed of plastic, metal or other material having shape memory characteristics for normally biasing first and second pins 62 and 63 each in the second outward position.

Figure 4:
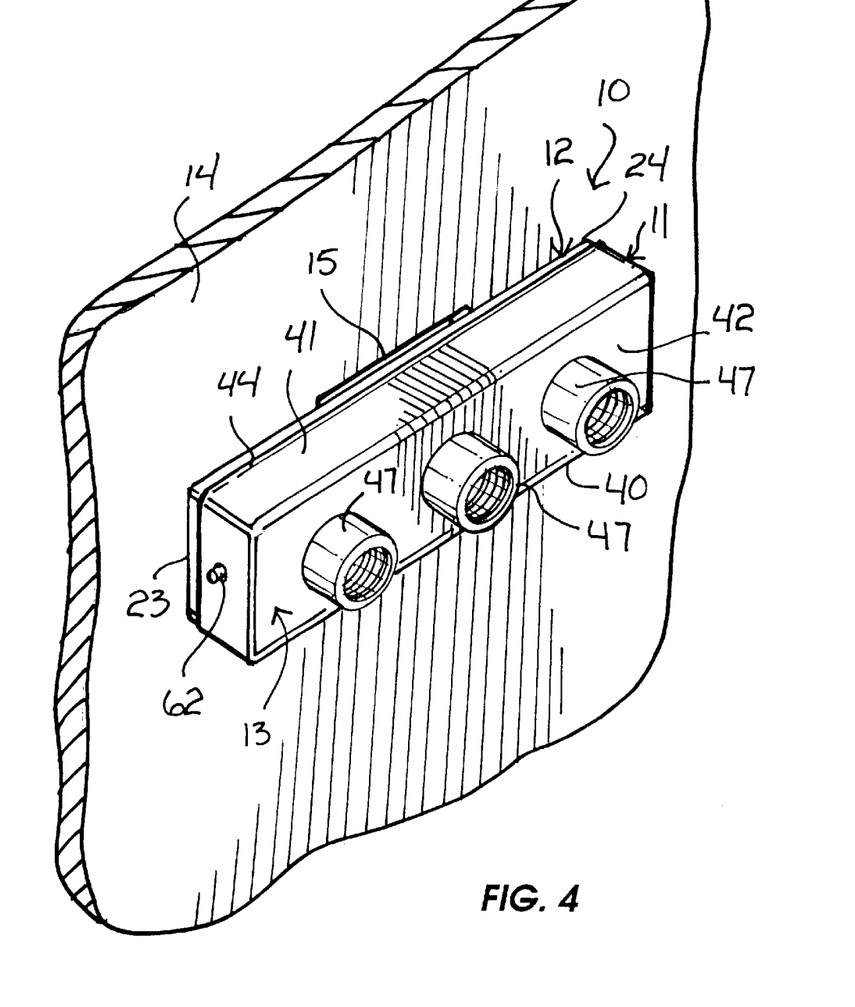
FIG. 4 is an isometric view of the cover shown as it would appear carried by the base.

As best shown in FIG. 2, complemental engagement assembly 61 comprises first and second apertures 70 and 71 carried by continuous sidewall 41 in spaced-apart and substantially opposing relation, each of which detachably receives therethrough one of first and second pins 62 and 63 for facilitating the detachable engagement of cover 13 with base in the normal first position shown in FIG. 4. To mount cover 13 onto base 12 in the normal second position, a user may engage and move first and second pins 62 and 63 inwardly, present cover 13 onto base 12 to capture first and second pins 62 and 63 against continuous sidewall 41, and then maneuver cover 13 onto base 12 to substantially engulf it as shown in FIG. 4 and permit first and second pins 62 and 63 each to snap receive into and through one of first and second apertures 70 and 71 to capture and detachably retain cover 13 with base 12. To remove cover 13, the foregoing operation need only be reversed.

FIGS. 6–13 illustrate an alternate embodiment of engagement apparatus denoted for clarity by the reference character 58'. Like engagement apparatus 58, engagement apparatus 58' may be positioned at any location along the entire extent of base 12 and cover 13. Consistent with the discussion of engagement apparatus 58, engagement apparatus 58' comprises an engagement assembly 100 carried by base 12 and a detachably engagable complemental engagement assembly 101 carried by cover 13. Regarding FIG. 7, engagement assembly 100 comprises a pin 102 mounted, in this specific embodiment, adjacent second extension 26 for movement in reciprocal directions through an opening 103 formed through second extension 26 as generally indicated by the double arrowed line X between an inward and an outward positions. A spring 105 carried by base 12 supports pin 102, and normally biases pin 102 in its outward position. Pin 102 is comprised of a neck 106, which leads from spring 105 to an enlarged head 107. Spring 105 allows reciprocal movement of pin 102 in response to application of a force against pin 102. Spring 105 can be constructed of plastic, metal or other material having shape memory.

Figure 7:
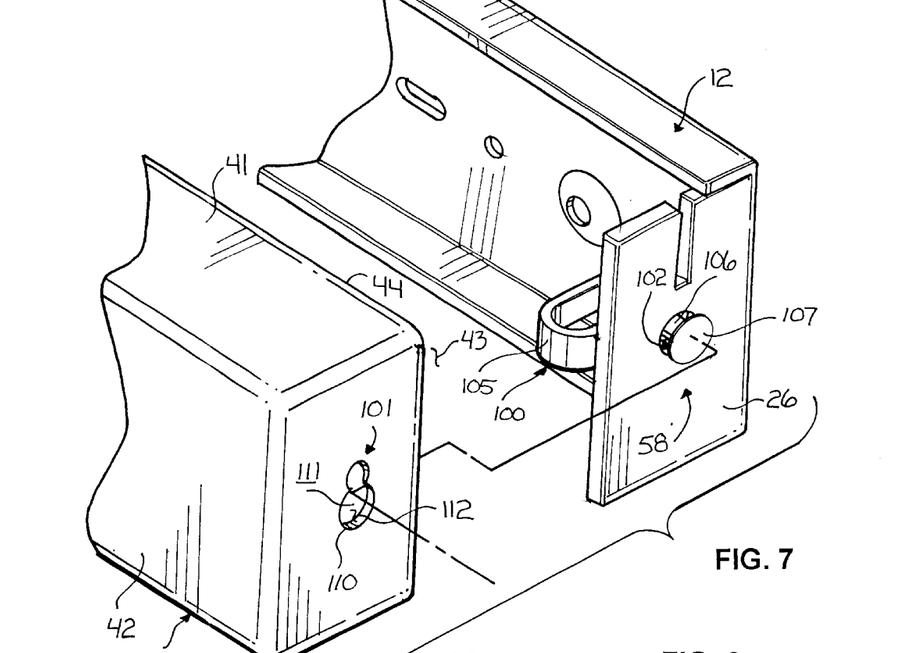
FIG. 7 is a fragmented perspective view of the cover and the base of FIG. 1, the base having the engagement element of FIG. 6 positioned for engagement to a key way supported by the cover, the key way comprising an aperture defining narrowed and enlarged portions.
Figure 10:
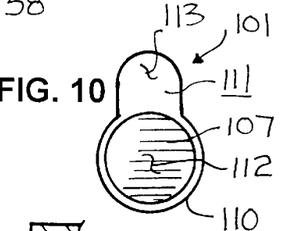
FIG. 10 is a side view of the engagement element of FIG. 6 shown as it would appear extending through the enlarged portion of the key way of FIG. 8.
Figure 11:
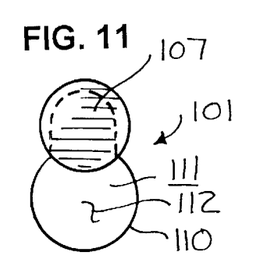
FIG. 11 is a view much like that of FIG. 10 showing the engagement element as it would appear extending through the narrowed portion of the key way.

Regarding FIG. 7, complemental engagement assembly 101 comprises a key way 110 defined by an aperture 111 carried by continuous sidewall 41. With additional reference to FIG. 9, aperture 111 includes an enlarged portion 112 and a narrowed portion 113. Enlarged portion 112 is sized for accommodating the head 107 and neck 106 of pin 102, and narrowed portion 113 is sized for accommodating only the neck 106 of pin 102. FIG. 10 shows head 107 as it would appear accommodated by enlarged portion 112. In FIG. 7, it is shown that head 107 is of a size too great to pass through narrowed portion 113.

Figure 8:
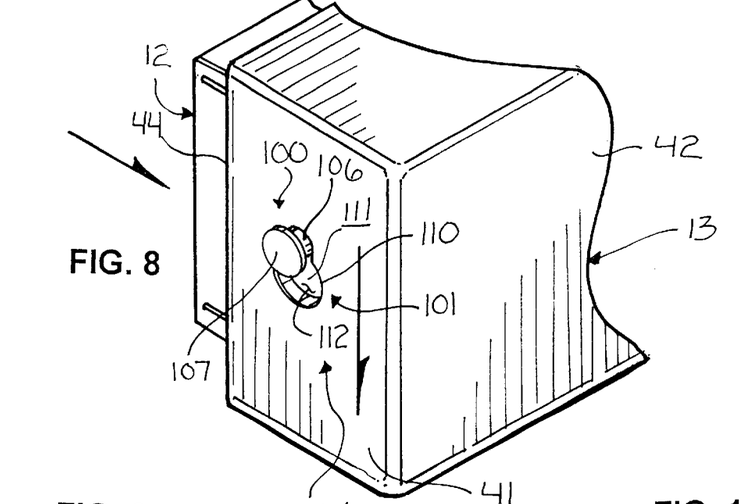
FIG. 8 is a fragmented perspective view of the cover and base of FIG. 7 shown as they would appear coupled, and the engagement element of FIG. 6 shown engaged to the key way of FIG. 7.
Figure 9:
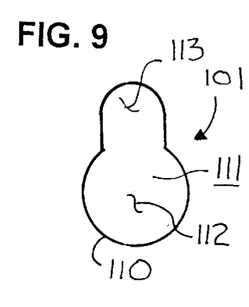
FIG. 9 illustrates a side view of the key way of FIG. 8.
Figure 12:
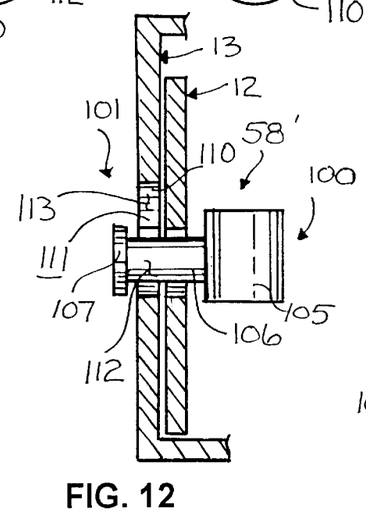
FIG. 12 is a sectional view of the base and cover shown as they would appear coupled together as in FIG. 8, and the engagement element of FIG. 6 shown as it would appear extending through the narrowed portion of the key way.
Figure 13:
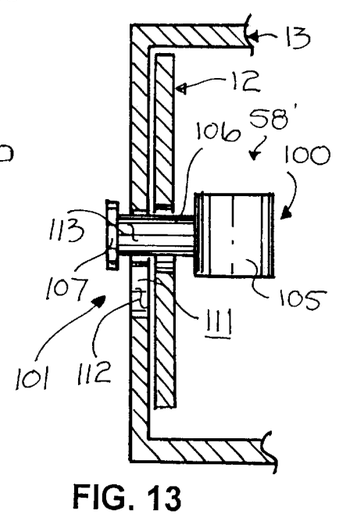
FIG. 13 is a sectional view much like that of FIG. 12 showing the engagement element of FIG. 6 as it would appear extending through the narrowed portion of the key way.

To mount cover 13 onto base 12 in the normal second position, a user may engage and move pin 102 inwardly in response to application of a compressive force against pin 102, present cover 13 onto base 12 to capture head 107 against continuous sidewall 41, and then maneuver cover 13 onto base 12 to substantially engulf it as shown in FIG. 8 and to cause head 107 and neck 106 to move into its outward position and snap receive into and through enlarged portion 112 of key way 110 as shown in FIG. 12. At this point, the user may slide or move cover 13 to seat neck 106 into the narrowed portion 113 as shown in FIGS. 8 and 13 to capture and detachably retain cover 13 with base 12. Key way 110 is specifically oriented so that the force of gravity will work against cover 13 to maintain the seating of neck 106 in narrowed portion. Furthermore, cover 13 is sized for allowing it to be moved relative base 12 to orient pin at and between the enlarged and narrowed portions 112 and 113 of key way 110. Because head 107 is of a size too great to pass through narrowed portion 113, cover may be removed only by reversing the foregoing operation. This is important because in the event a child reaches housing 11 and attempts to remove cover 13 risking electrical shock, it will be difficult to do so without an understanding of how to remove cover 13 through operation of engagement apparatus 58'. This frustration will, most certainly, outlive the child's desire to remove cover 13. Furthermore, although only one engagement assembly 110 and complemental engagement assembly 111 combination has been discussed, another such combination may be provided in relation to first extension 25.

Figure 14:
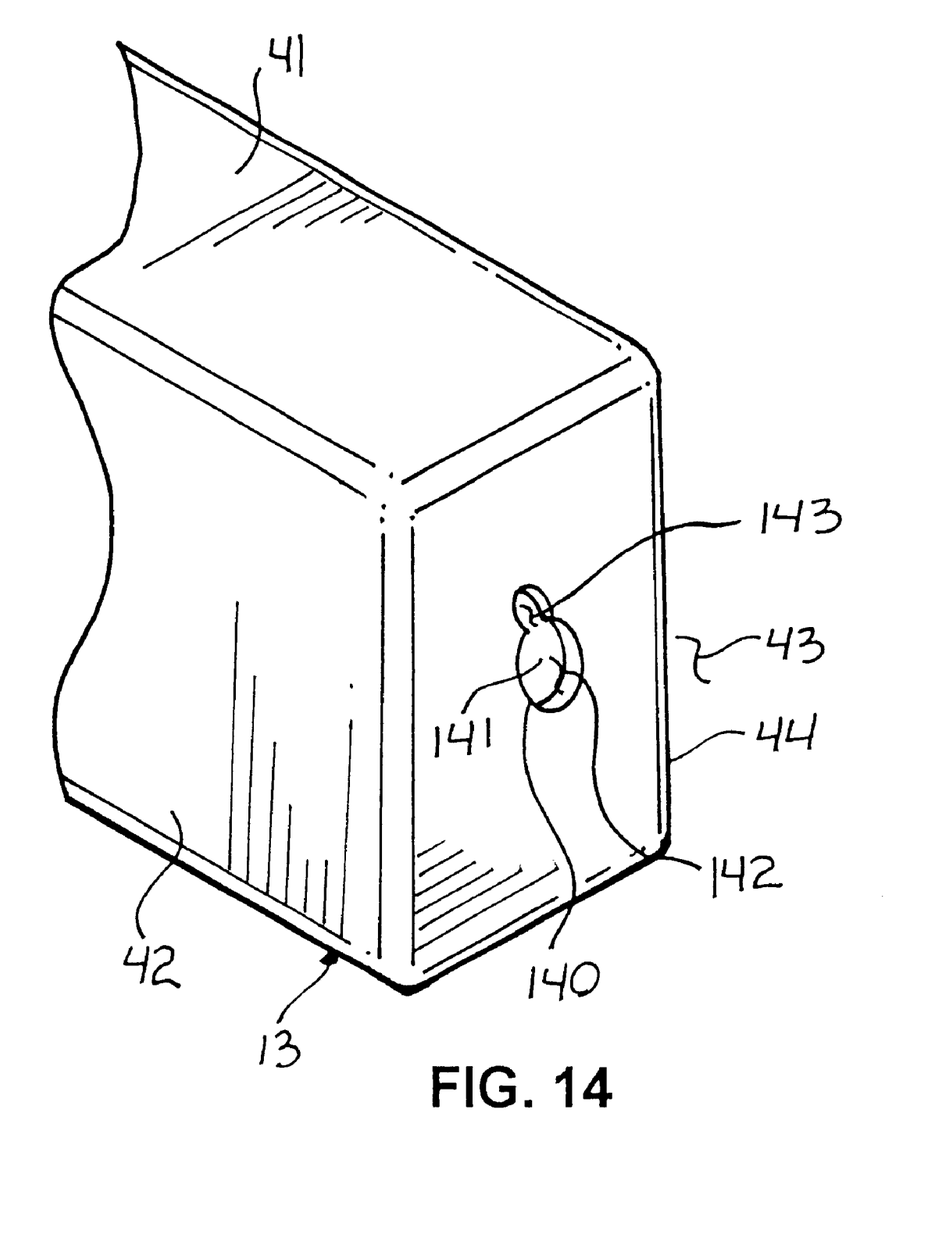
FIG. 14 is another embodiment of a key way of the invention.

Turning to FIG. 14, shown is another embodiment of a key way 140. Like key way 110, key way 140 comprises an aperture 141 that defines an enlarged portion 142 and a narrowed portion 143. Key way 140 functions similarly to key way 110, further details of which will not be again discussed. However, unlike key way 110, the narrowed portion 143 of key way 140 is slanted, angled or otherwise formed or positioned to reach upwardly somewhat away from open end 43 of cover 13 and toward closed end 42 of cover 13 so that cover 13 moves against the wall to which the base 12 is mounted as narrowed portion 142 accommodates the neck 106. In this regard, as narrowed portion 143 is moved downwardly onto neck 106 during the above-described procedure for coupling cover 13 to base 12, the angular disposition of narrowed portion 143 drives open end 43 of cover 13 toward the wall to which base 12 is normally mounted as neck 106 passes into narrowed portion 143, which causes open end 43 to mate closely with the wall, totally concealing base 12. This provides for a neat and very professional installment. A plurality of such key ways may be used with the invention for providing this desirable coupling of cover 13 to base 12.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A housing comprising:
 a base;
 a cover engagable to the base in a first position;
 a receptacle carried by the base for receiving and supporting the cover away from the base in a second position; and
 apparatus for engaging the cover to the base in the first position comprising at least one pin carried by the base and a keyway carried by the cover, the pin having a neck leading to an enlarged head and the keyway including an enlarged portion for receiving the enlarged head and a narrowed portion for accommodating only the neck.

2. The housing of claim 1, wherein the receptacle comprises a slot.

3. The housing of claim 2, wherein the slot is carried by an extension of the base.

4. The housing of claim 1, wherein the receptacle comprises slots.

5. The housing of claim 4, wherein the slots are each carried by one of a plurality of extensions of the base.

6. A housing comprising:
 a base;
 a cover engagable to the base in a first position;
 a receptacle carried by the base for receiving and supporting the cover away from the base in a second position; and
 apparatus for engaging the cover to the base in the first position comprising pins carried by the base and keyways carried by the cover, the pins each having a neck leading to an enlarged head and the keyways each including an enlarged portion for receiving the enlarged head of one of the pins and a narrowed portion for accommodating only the neck of one of the pins.

7. The housing of claim 6, wherein the receptacle comprises a slot.

8. The housing of claim 7, wherein the slot is carried by an extension of the base.

9. The housing of claim 6, wherein the receptacle comprises slots.

10. The housing of claim 9, wherein the slots are each carried by one of a plurality of extensions of the base.

11. An electrical fixture comprising:
 a base;
 a cover engagable to the base in a first position and in electrical communication with an electrical power source;

a receptacle carried by the base for receiving and supporting the cover away from the base in a second position; and apparatus for engaging the cover to the base in the first position comprising at least one pin carried by the base and a keyway carried by the cover, the pin having a neck leading to an enlarged head and the keyway including an enlarged portion for receiving the enlarged head and a narrowed portion for accommodating only the neck.

12. The electrical fixture of claim 11, wherein the receptacle comprises a slot.

13. The electrical fixture of claim 12, wherein the slot is carried by an extension of the base.

14. The electrical fixture of claim 11, wherein the receptacle comprises slots.

15. The electrical fixture of claim 14, wherein the slots are each carried by one of a plurality of extensions of the base.

* * * * *